INVENTOR.
Emile Balligand
BY
Cushman, Darby & Cushman
ATTORNEYS

Sept. 23, 1969    E. BALLIGAND    3,468,378
LIFTER FOR BEET AND OTHER ROOT PLANTS Filed Oct. 20, 1965    3 Sheets-Sheet 2

INVENTOR
Emile Balligand
BY
Cushman, Darby & Cushman
ATTORNEYS

United States Patent Office 3,468,378
Patented Sept. 23, 1969

3,468,378
LIFTER FOR BEET AND OTHER ROOT PLANTS
Emile Balligand, Jemeppe-sur-Meuse, Belgium, assignor to Société Anonyme Societer, Orp-le-Grand, Belgium, a company of Belgium
Filed Oct. 20, 1965, Ser. No. 498,249
Claims priority, application Belgium, Oct. 26, 1964, 4,581
Int. Cl. A01d 25/04
U.S. Cl. 171—58                                    3 Claims

ABSTRACT OF THE DISCLOSURE

Apparatus as disclosed for the harvesting of beet and similar plants from which the leaves and stems have been previously cut and removed. According to the preferred embodiment, a single pair, or groups of pairs, of circular discs are fixed to a rotatable shaft and inclined by guide means to form a V-arrangement whereby the lower periphery of the discs penetrates the earth and dislodges and lifts beet roots for subsequent conveying. Each of the pairs of discs is mounted on the shaft by a Cardan-type arrangement so that the rotating discs are maintained in oblique planes.

---

The invention relates to a lifter for beet and other root plants, equipped with discs disposed in V-arrangement and between which the beet are engaged and then lifted due to the rotation of the discs.

The control of the V-discs involves difficulties of a mechanical nature, due to the fact that the said discs rotate on oblique pivots, so that each driven disc requires a separate driving device, this being in known lifters for example a Cardan transmission system. When the two discs are driven, this arrangement involves a complicated and cumbersome mechanism in view of the power take-off taps which are necessary. Although a mechanism of this kind may have sufficient space on a lifter which has only a single pair of V-discs and thus only works a single line of beet at one time, it is impossible to fit it between the discs of a lifter equipped with a multiplicity of pairs of V-discs and therefore capable of simultaneously lifting the beet from as many lines as there are pairs of discs.

The lifter according to the present invention is distinguished by its extreme mechanical simplicity and also by further advantages which will be disclosed during the description. Although it is suitable for working a single line of beet, it can readily be equipped with a plurality of pairs of discs.

According to the invention, the lifter comprises at least one pair of co-operating discs each of which is mounted by means of a Cardan arrangement on a horizontal shaft which is driven in rotation and maintained at the desired angle of convergence by guide members.

Advantageously, the horizontal shaft which is driven in rotation is common to the discs of one pair or of a plurality of pairs of co-operating discs.

Each disc comprises a Cardan cross-pin joining a hub keyed on the shaft which is driven in rotation to an external ring which acts on the beet. Advantageously, the cross-pins of two co-operating discs are offset relatively to each other, preferably by 90°, in such manner as to produce a slight phase displacement in the circumferential velocity of the co-operating discs, this imparting to the beet a circular and vibratory movement which facilitates the release from the soil of the said beet.

The members maintaining the desired angle of convergence between the co-operating discs comprise, in respect of each disc, two guide rollers acting against the outer ring of the disc. The said rollers rotate idly on pivots which are mounted on the lifter frame and enclose between them an angle ranging from 60 to 120°, preferably an angle of 90°. The guide rollers are advantageously disposed above the shaft which is driven in rotation and act against the face of the disc contacting the beet.

The axis of at least one of the guide rollers acting on the external ring of a disc is resiliently mounted on the frame, this having the advantage that the angle of convergence between the external rings of the two co-operating discs is able to adapt itself automatically to the variable dimensions of the beet. To this end, the roller axis mounted resiliently on the frame advantageously forms one of the arms of a cranked lever which is articulated to the frame and the other arm of which is urged by a spring.

The guide rollers may be eccentric or their contours may be other than circular, so as to impart to the outer rings an oscillating movement which imparts substantially transverse vibrations to the beet, in this way also facilitating the release from the ground thereof.

The accompanying drawings show, by way of example, a plurality of forms of embodiment of the invention; in the drawings.

Figure 2:
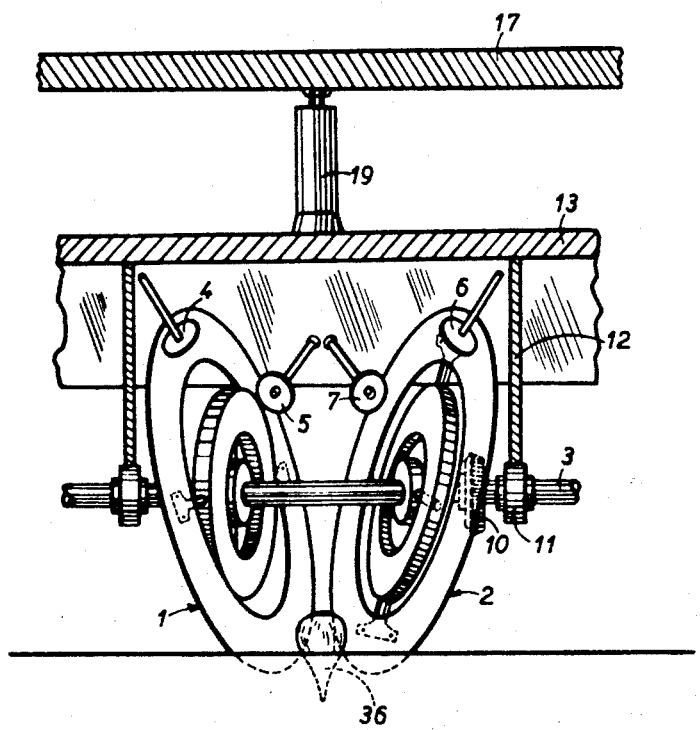
FIGURE 2 is a diagrammatic front view of a pair of discs.

The beet lifter according to the invention comprises at least one pair of co-operating discs 1 and 2 (FIGURE 2) which are disposed in V-arrangement and are mounted in a Cardan joint arrangement on a horizontal shaft 3 and are maintained at the desired angle of convergence by rollers 4, 5, 6 and 7 which constitute guide members.

Figure 1:
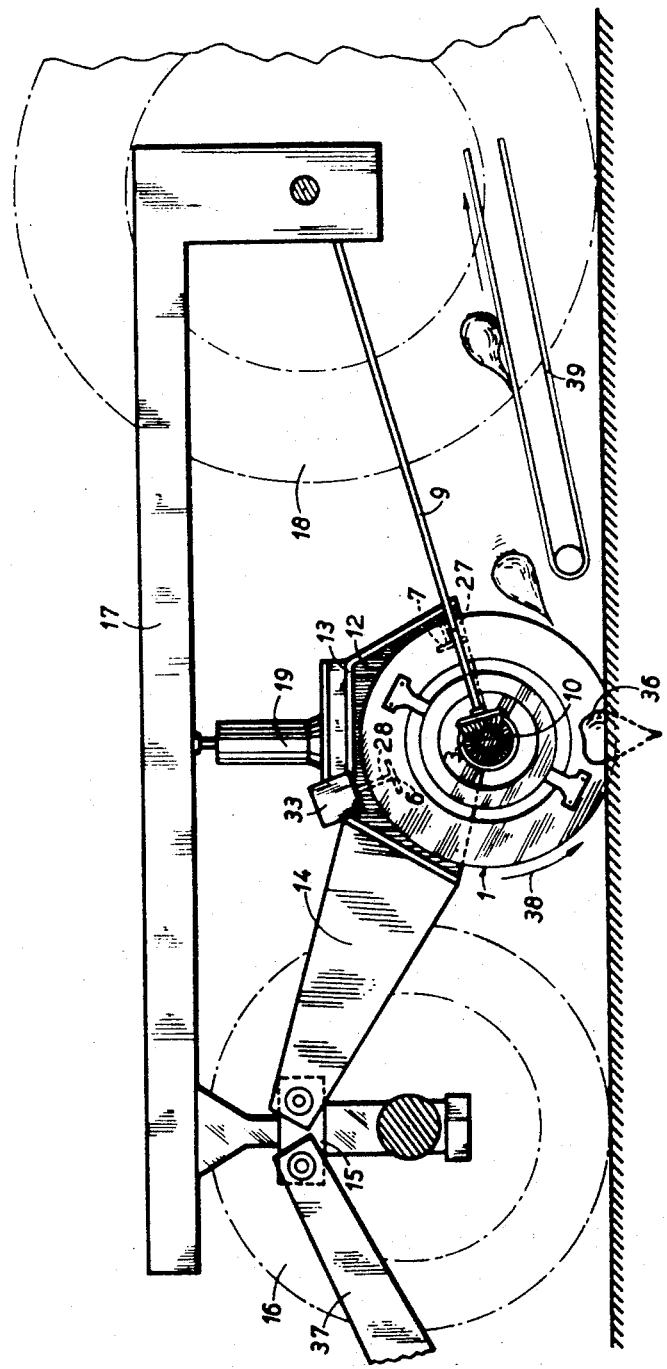
FIGURE 1 is a partial diagrammatic longitudinal section of a beet lifter comprising V-discs according to the invention.

The shaft 3 is driven in rotation, for example by a Cardan transmission 9 (FIGURE 1) connected directly or indirectly to the power take-off of a tractor and terminating in a conical gearing the pinion 10 of which is keyed on the shaft 3. The latter is able to rotate in bearings 11 (FIGURE 2) mounted in flanges 12 fast with a frame 13 which is articulated through the agency of arms 14 (FIGURE 1) to the front portion 15 supported by steerable wheels 16 of a tractor having a supporting frame 17 and driving wheels 18 disposed to the rear of the shaft 3. Disposed between the frame 13 and the frame 17 is an hydraulic jack 19 or other means permitting regulation of the entry of the discs 1, 2 into the soil and the lifting of the latter for the road-travel of the lifter. This mode of mounting the shaft 3 which is driven in rotation on a tractor is given purely by way of example and it could, where appropriate, be carried into effect in any other manner.

On the shaft 3 which is driven in rotation there may be mounted, by means of Cardan arrangement, one or more pairs of discs 1, 2 which are disposed in V-arrangement and the shaft may, due to this fact, project laterally from the tractor, either on one side or on both sides. The fact that it is readily possible to align on one and the same shaft a multiplicity of pairs of discs disposed in V-arrangement and all driven in rotation is due to the simplicity of the driving mechanism and to the absence of bulky mechanism which would not allow two pairs of discs to be drawn together sufficiently near to permit them to work on lines of beet having between them the conventional spacing of for example 45 centimetres.

Figure 3:
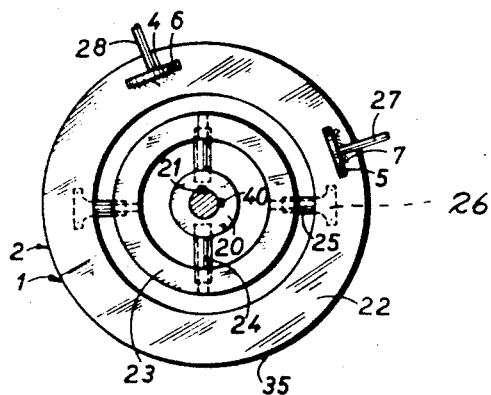
FIGURE 3 shows, as a plan view, a disc mounted in Cardan joint arrangement.

According to the invention, each disc comprises, for this purpose, a hub 20 (FIGURE 3) which is keyed on the shaft 3 by a key 21 and is connected to the outer ring 22 by a Cardan cross-pin. The latter consists of an intermediate ring 23 and also inner radial pins 24 between the hub 20 and the intermediate ring 23 and outer radial pins 25 between the said ring 23 and the outer ring 22. In a practical form of embodiment, the pins 24 are fast with the hub 20 and the pins 25 abut on a lug 26 secured to the ring 22. The ends of the pins 24 and 25 thus pivot in recesses formed in the intermediate ring 23.

Figure 4:
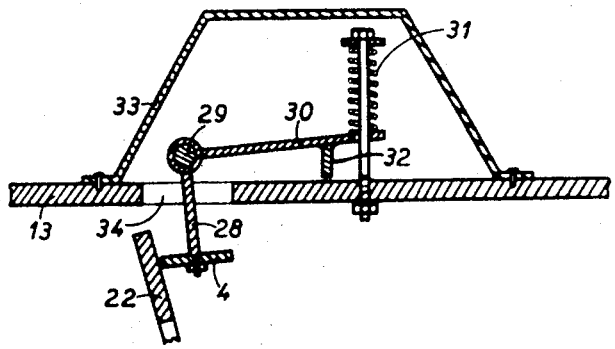
FIGURE 4 shows a resilient guide member for a disc.

In order to arrange and maintain in V-formation the outer rings 22 of two co-operating discs mounted in Cardan arrangement, each of the said rings is guided by two rollers 4, 5 or 6, 7. The rollers rotate idly on pivots which are mounted radially relatively to the shaft 3 on the frame 13, preferably above the said shaft, and which urge the rings to the side at which they act on the beet. The pivots of the rollers enclose between them and angle which may range from approximately 60 to 120° but which is preferably 90°. The axis 27 (FIGURE 3) carrying the rollers 5 or 7 may be rigidly secured on the frame, whereas the axis 28 carrying the rollers 4 or 6 is advantageously resiliently mounted. It forms for example one of the arms of a cranked lever which is articulated by means of a pivot 29 (FIGURE 4) to the frame 13 and the other arm 30 of which is urged by an adjustable-tension spring 31. Advantageously, the pivot 29, the spring 31 and also a stop 32 limiting the travel of the arm 30 are disposed in a small housing 33 mounted on the frame 13 and formed with an aperture 34 allowing the passage of the axis 28. The resiliently mounted rollers 4 or 6 are disposed on the open side of the V, in such manner that the point 35 (FIGURE 3) at which the rings of two co-operating discs are at their smallest distance of for example 3 to 6 centimetres is located in prolongation of their axis 28, at the opposite edge of the ring. This point at which the said rings are nearest together is advantageously offset by approximately 20° to the rear of the lowest point of the rings 22. The resilient mounting of the rollers 4 or 6 results in the inclination of the rings adapting itself readily to the shape of the beet 36 (FIGURES 1 and 2) and also in the fact that a stone engaged between the two rings will not be able to damage them.

The rings 22 of a pair of co-operating discs are maintained by the guide rollers in oblique planes which enclose an angle of approximately 20° relatively to a vertical median plane and also an angle of the same order of magnitude relatively to a horizontal plane extending through the axis of the driving shaft 3.

The beet lifter may be used in combination with a device for removing the leaves of beets or topping them, which said device is of the type described and illustrated, for example, in my prior United States Patent No. 3,365,868, entitled Apparatus for Removing Leaves From Beets, which issued on Jan. 30, 1968. When the latter advance along the lines of beet, the latter first of all have their leaves and tops removed and are then gripped between the rings 22 of a pair of discs. The said rings, to which a movement of rotation in the direction of the arrow 38 (FIGURE 1) is imparted by the shaft 3, are depressed several centimetres into the soil and, as they enter into contact with the beet, they grip it underneath, remove it from the soil and impart to it a lifting movement which projects it between the two rings to a height above the soil at which the rings are sufficiently spaced apart to allow it to pass between them. The beet can then be taken up, for example by an endless conveyor belt shown diagrammatically at 39 (FIGURE 1) which conveys it to a trailer attached to the tractor.

In order to facilitate the lifting of the beet, the Cardan cross-pins of the two co-operating discs are offset relatively to each other by 90°, the effect of this being to slightly dephase the circumferential velocities of the rings 22 and to impart circular vibrations to the beet. The offsetting of the cross-pins may readily be effected by forming in the hub 20 a second keying groove 40 (FIGURE 3) which is utilised for the keying of one of the hubs of a pair of discs.

Figure 5:
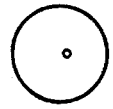
FIGURES 5 and 6 are plan view of guide rollers, one of which is circular and eccentric whereas the other is of non-circular shape.
Figure 6:
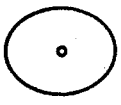

The lifting of the beet is furthermore facilitated if the guide rollers are eccentric (FIGURE 5) or if their contours are other than circular, being for example slightly elliptical (FIGURE 6). In both cases, the rings 22 carry out an oscillating movement which imparts transverse vibrations to the beet.

Of course, the invention is not limited to the embodiments described and illustrated hereinabove by way of example and the scope of the invention would not be exceeded if modifications were to be made thereto.

I claim:

1. Lifting apparatus for beet and other root plants, whereby the beet roots are engaged and lifted from the ground, comprising a frame, a horizontal shaft mounted on said frame for rotation, at least one pair of cooperating discs each of which is mounted in a Cardan arrangement on said shaft, guide members for maintaining a desired angle of convergence between said cooperating discs, each of said cooperating discs having its peripheral edges adapted to penetrate the earth in the area of closest proximity to the other cooperating disc so as to contact the undersides of beet roots and to lift the same during rotation of the discs, said guide members comprising idler rollers which act against each of said discs adjacent the outer periphery thereof, the axis of at least one of said guide rollers comprising one of the rigid arms of a cranked lever which is pivotally mounted on said frame and resiliently biased by means associated with the other lever arm; said resiliently biased axis and associated roller acting upon at least one of said pair of cooperating discs so as to vary the angle of convergence between the cooperating discs in order to adapt the lifting discs to varying sizes of beets.

2. Lifting apparatus for beet and other root plants, whereby the beet roots are engaged and lifted from the ground, comprising a frame, a horizontal shaft mounted on said frame for rotation, at least one pair of cooperating discs each of which is mounted in a Cardan arrangement on said shaft, guide members for maintaining a desired angle of convergence between said cooperating discs, each of said cooperating discs having its peripheral edges adapted to penetrate the earth in the area of closest proximity to the other cooperating disc so as to contact the undersides of beet roots and to lift the same during rotation of the discs, said guide members comprising idler rollers which act against each of said discs adjacent the outer periphery thereof, the contacting surfaces of said rollers being eccentric with respect to the roller axis so as to impart an oscillating motion to the rotating discs and thereby transmitting a transverse vibratory movement to the beets.

3. Lifting apparatus for beet and other root plants, whereby the beet roots are engaged and lifted from the ground, comprising a frame, a horizontal shaft mounted on said frame for rotation, at least one pair of cooperating discs each of which is mounted in a Cardan arrangement on said shaft, guide members for maintaining a desired angle of convergence between said cooperating discs, each of said cooperating discs having its peripheral edges adapted to penetrate the earth in the area of closest proximity to the other cooperating disc so as to contact the undersides of beet roots and to lift the same during rotation of the discs, said guide members comprising idler rollers which act against each of said discs adjacent the outer periphery thereof, the contacting surfaces of said rollers being non-circular so as to impart to the rotating discs an oscillating movement thereby transmitting substantially transverse vibrations to the beets.

References Cited

UNITED STATES PATENTS 702,502 6/1902 Stanton _____ 171—58
3,010,522 11/1961 Oppel _____ 171—58

ANTONIO F. GUIDA, Primary Examiner

U.S. Cl. X.R.

172—106